(12) United States Patent
Iritani

(10) Patent No.: US 11,012,586 B2
(45) Date of Patent: May 18, 2021

(54) IMAGE FORMING DEVICE

(71) Applicant: KYOCERA Document Solutions Inc., Osaka (JP)

(72) Inventor: Kazunobu Iritani, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/970,849

(22) PCT Filed: Feb. 14, 2019

(86) PCT No.: PCT/JP2019/005276
§ 371 (c)(1),
(2) Date: Aug. 18, 2020

(87) PCT Pub. No.: WO2019/163627
PCT Pub. Date: Aug. 29, 2019

(65) Prior Publication Data
US 2021/0092250 A1 Mar. 25, 2021

(30) Foreign Application Priority Data
Feb. 23, 2018 (JP) .............................. JP2018-030760

(51) Int. Cl.
*H04N 1/00* (2006.01)
(52) U.S. Cl.
CPC ..... *H04N 1/00896* (2013.01); *H04N 1/00323* (2013.01); *H04N 1/00835* (2013.01); *H04N 2201/0094* (2013.01)

(58) Field of Classification Search
CPC ........... H04N 1/00896; H04N 1/00835; H04N 1/00323; H04N 2201/0094
See application file for complete search history.

(56) References Cited

U.S. PATENT DOCUMENTS

| 8,768,196 | B2* | 7/2014 | Baba .................. | G03G 15/5004 |
| | | | | 399/81 |
| 2012/0105896 | A1* | 5/2012 | Ito ........................ | G03G 15/043 |
| | | | | 358/1.14 |
| 2015/0098104 | A1* | 4/2015 | Konosu ............. | H04N 1/00835 |
| | | | | 358/1.13 |

FOREIGN PATENT DOCUMENTS

JP 2007-4523 A 1/2007

* cited by examiner

*Primary Examiner* — Neil R McLean
(74) *Attorney, Agent, or Firm* — Stein IP, LLC

(57) ABSTRACT

After a fixed period of time has passed with no operation received by an operating unit, a control unit switches the operation mode to a first power saving mode when the brightness detected by a brightness detection unit is greater than or equal to a given brightness, and switches the operation mode to a second power saving mode when the brightness detected is less than the given brightness. The control unit extends the detection range of a human detection unit in the second power saving mode to a range broader than the range used in the first power saving mode.

8 Claims, 6 Drawing Sheets

IMAGE FORMING DEVICE

CROSS-REFERENCE TO RELATED APPLICATIONS

This application is a national stage of International Application No. PCT/JP2019/005276 filed Feb. 14, 2019, which claims the benefit of priority to Japanese Application No. 2018-030760, filed Feb. 23, 2018, in the Japanese Patent Office, the disclosures of which are incorporated herein in their entireties by reference.

TECHNICAL FIELD

The present invention relates to an image forming apparatus enabled to operate in different power-saving modes.

BACKGROUND ART

Not a few image forming apparatuses are equipped with a function of shifting over to a power-saving mode. For example, in a facsimile device described in JP 2007-4523 A, an ambient brightness is detected by a brightness sensor and, depending on the brightness, the mode is switched over to the power-saving mode. This facsimile device switches over to the power-saving mode on condition that an ambient brightness is below a certain level.

LIST OF CITATIONS

Patent Literature

PTL 1: JP 2007-4523 A

SUMMARY OF THE INVENTION

Problem to be Solved by the Invention

The facsimile device of JP 2007-4523 A returns from the power-saving mode to a normal mode when an ambient situation has become bright or when an incoming call has arrived at the facsimile. However, when a user intends to operate the facsimile device to make a return to the normal mode under a continued dark ambient condition without awaiting any incoming call, it may be hard to specifically determine the position of the facsimile device such that e operation for the return to the normal mode may encounter a difficulty.

In light of the above-described problems of the prior art, an object of the present invention is to provide an image forming apparatus capable of returning from the power-saving mode to the normal mode with high precision.

Solution to Problem

In order to achieve the above object, an image forming apparatus according to claim 1 is capable of switching over between a first power-saving mode and a second power-saving mode, whichever involves less power consumption relative to a normal operational state. The image forming apparatus includes a human detection unit, a brightness detection unit, an operation unit, and a controller. The human detection unit detects a person present in vicinity. The brightness detection unit detects a brightness in vicinity. The operation unit accepts an operation made by a user. The controller is connected to the human detection unit, the brightness detection unit, and the operation unit. The human detection unit is variable in human detection range. When a brightness detected by the brightness detection unit after a certain period has elapsed under an operation-unaccepted state of the operation unit is equal to or higher than a certain brightness, the controller makes a switchover to the first power-saving mode. When the detected brightness is lower than the certain brightness, the controller makes a switchover to the second power-saving mode. In the second power-saving mode, the controller sets the detection range of the human detection unit wider than in the first power-saving mode.

Advantageous Effects of the Invention

According to the present invention, there can be provided an image forming apparatus capable of returning from the power-saving mode to the normal mode with high precision.

EMBODIMENTS OF THE INVENTION

Hereinbelow, embodiments of the present invention will be described on a multifunction peripheral 100 as an example of image forming apparatuses with reference to the accompanying drawings. Individual components such as configuration, placement and the like described in those embodiments should be construed not as limiting the scope of the invention but as being a mere explanatory example.

First Embodiment

Figure 1:
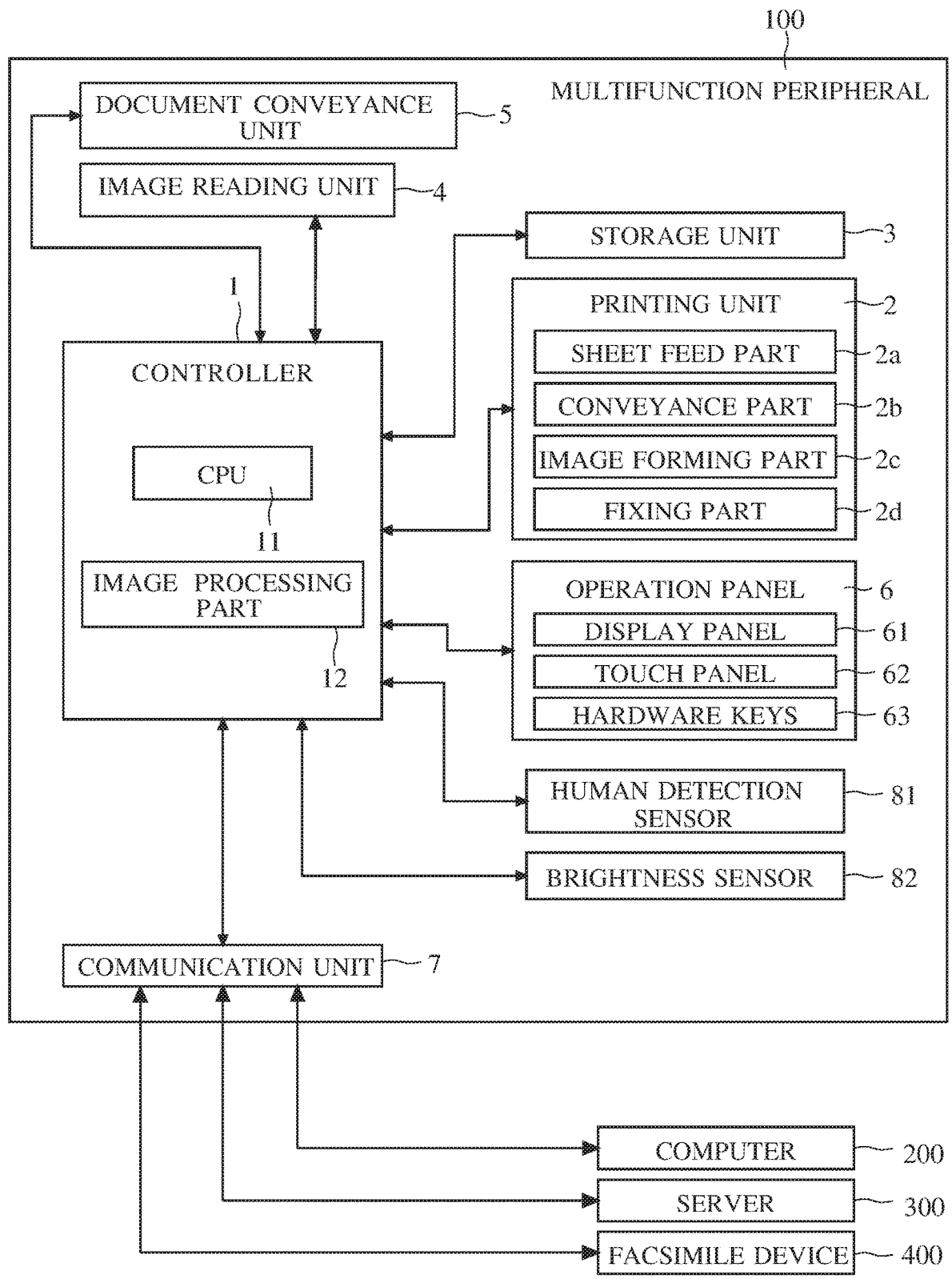
FIG. 1 is a functional block diagram showing a main configuration of a multifunction peripheral.
Figure 2:
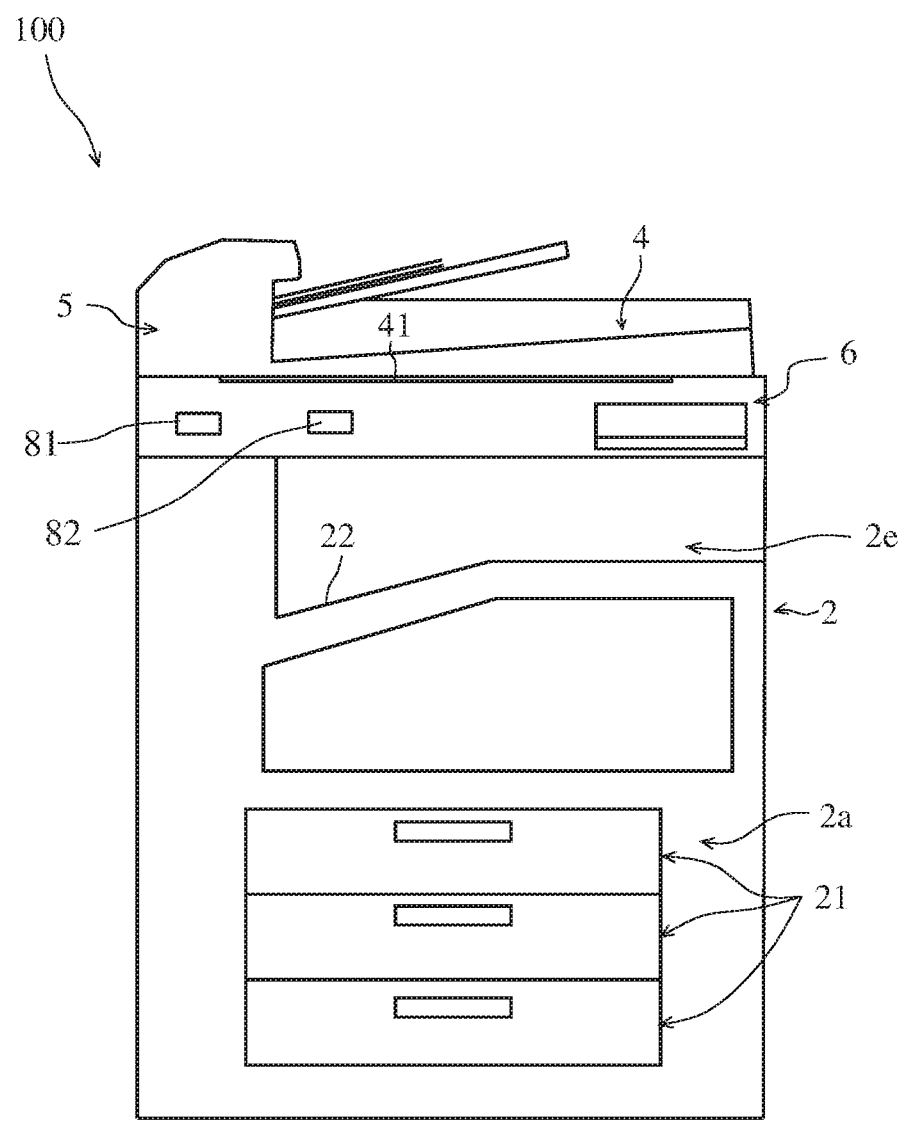
FIG. 2 is a view showing a schematic configuration of one example of the multifunction peripheral.

FIG. 1 is a functional block diagram showing a main configuration of a multifunction peripheral. FIG. 2 is a view showing a schematic configuration of one example of the multifunction peripheral. In the following description, with reference to the multifunction peripheral 100 shown in FIG. 2, one side of the multifunction peripheral closer to a viewer of the drawing is defined as a forward side (front side).

(Multifunction Peripheral 100)

The multifunction peripheral 100 is a multifunction peripheral equipped with multiple functions such as copier, printer, scanner and facsimile functions.

As shown in FIGS. 1 and 2, the multifunction peripheral 100 is provided with a controller 1, a printing unit 2, and a storage unit 3. The multifunction peripheral 100 also includes an image reading unit 4, a document conveyance unit 5, an operation panel 6, a communication unit 7, a human detection sensor 81, and a brightness sensor 82.

The controller 1 performs total control over the multifunction peripheral 100. The controller 1 includes a CPU 11. The multifunction peripheral 100 is also provided with the storage unit 3 including nonvolatile memory such as ROM, HDD and flash ROM as well as volatile memory such as RAM. The storage unit 3 stores control-related programs and data. The controller 1 controls individual units and parts by using the programs and data of the storage unit 3. The controller 1 controls scanning, printing, transmission, and storage of image data to be performed during copying, transmission and other like jobs. The controller 1 is further provided with an image processing unit 12 which performs image processing based on image data outputted from the image reading unit 4.

(Printing Unit 2)

The printing unit 2 includes a sheet feed part 2a, a conveyance part 2b, an image forming part 2c, a fixing part 2d, and a sheet discharge part 2e (see FIG. 2). The sheet feed part 2a feeds a sheet of paper. The conveyance part 2b conveys a sheet and discharges a printed sheet out of the apparatus. The image forming part 2c forms a toner image based on image data, and transfers the toner image onto a sheet which is conveyed. The fixing part 2d fixes a transferred toner image onto a sheet. The controller 1 controls operation of the printing unit 2.

As shown in FIG. 2, the sheet feed part 2a includes a plurality of sheet feed cassettes 21. On the plurality of sheet feed cassettes 21, paper sheets that differ in at least one of size and orientation from one another are to be set therein. The controller 1 selects one of the sheet feed cassettes 21 in which relevant sheets are contained. Then, the sheet feed part 2a feeds out a sheet from the selected sheet feed cassette 21 in compliance with an instruction from the controller 1.

As shown in FIG. 2, the multifunction peripheral 100 has a discharge tray 22 provided at a vertically middle portion. A sheet on which an image has been fixed by the fixing part 2d is discharged onto the discharge tray 22 by the sheet discharge part 2e.

(Image Reading Unit 4, Document Conveyance Unit 5)

Under control by the controller 1, the image reading unit 4 reads an image of a document set on top of the housing of the image reading unit to generate image data. Under control by the controller 1, the document conveyance unit 5 conveys a document to a contact glass 41 of the image reading unit 4. In addition, in a case where the multifunction peripheral 100 is configured to fulfill the printer function alone, the image reading unit 4 and the document conveyance unit 5 are excluded.

(Operation Panel 6)

The operation panel 6 includes a display panel 61, a touch panel 62, and hardware keys 63. The touch panel 62 is intended to detect a user's touch position. Based on a touch position detected by the touch panel 62, the controller 1 recognizes an operated one of keys, buttons or other operation images displayed on the display panel 61. The hardware keys 63 include a start key for instructing a start of job execution and ten keys for entering numerals. The controller 1 instructs the display panel 61 to display a status of the operation panel 6, various messages, or a setting screen. Also, the operation panel 6 accepts setting operations for the touch panel 62 and the hardware keys 63 in relation to scanning, copying or other jobs.

(Communication Unit 7)

The communication unit 7 is communicatably connected to a PC or other computer 200, a server 300, a facsimile device 400, and the like via a wired and(/or) wireless network or public line or the like. Further, devices that perform transmission and reception of image data, other than the above-described ones, may also be connected to the communication unit 7.

(Human Detection Sensor 81)

As shown in FIG. 1, the human detection sensor 81 is connected to the controller 1. The human detection sensor 81 is installed on the multifunction peripheral 100 as shown in FIG. 2. In this case, the human detection sensor 81 is placed on a front face of the multifunction peripheral 100. The human detection sensor 81, which is an example of a human detection unit, detects presence of a person when any person is present in proximity to the multifunction peripheral 100. Upon detecting a person, the human detection sensor 81 informs the controller 1 of the detection of a person.

The human detection sensor 81 may be, for example, a pyroelectric sensor for detecting infrared rays (body temperature) emitted from a human body, an acoustic-wave sensor using acoustic waves, a sound sensor for detecting sounds, or the like. Also, other sensors capable of detecting a human body may be widely adopted. Furthermore, these sensors may be used in combination.

The human detection sensor 81 is provided variable in detection range. The detection range of the human detection sensor 81 is changed according to an instruction from the controller 1.

(Brightness Sensor 82)

As shown in FIG. 1, the brightness sensor 82 is connected to the controller 1. The brightness sensor 82 is installed on the multifunction peripheral 100 as shown in FIG. 2. The brightness sensor 82, which is an example of a brightness detection unit, detects brightness of a vicinity of the multifunction peripheral 100. The brightness sensor 82 transmits a detected brightness to the controller 1. For this operation, it is also allowable that with a threshold previously set to an illuminance, an ON signal is issued for the detected brightness higher than the threshold while an OFF signal is issued for the detected brightness lower than the threshold.

The brightness sensor 82 may be, for example, an illuminance sensor for detecting ambient illuminance. Other than this, sensors capable of detecting ambient brightness may also be widely adopted.

(On Operation of Multifunction Peripheral 100)

Figure 3:
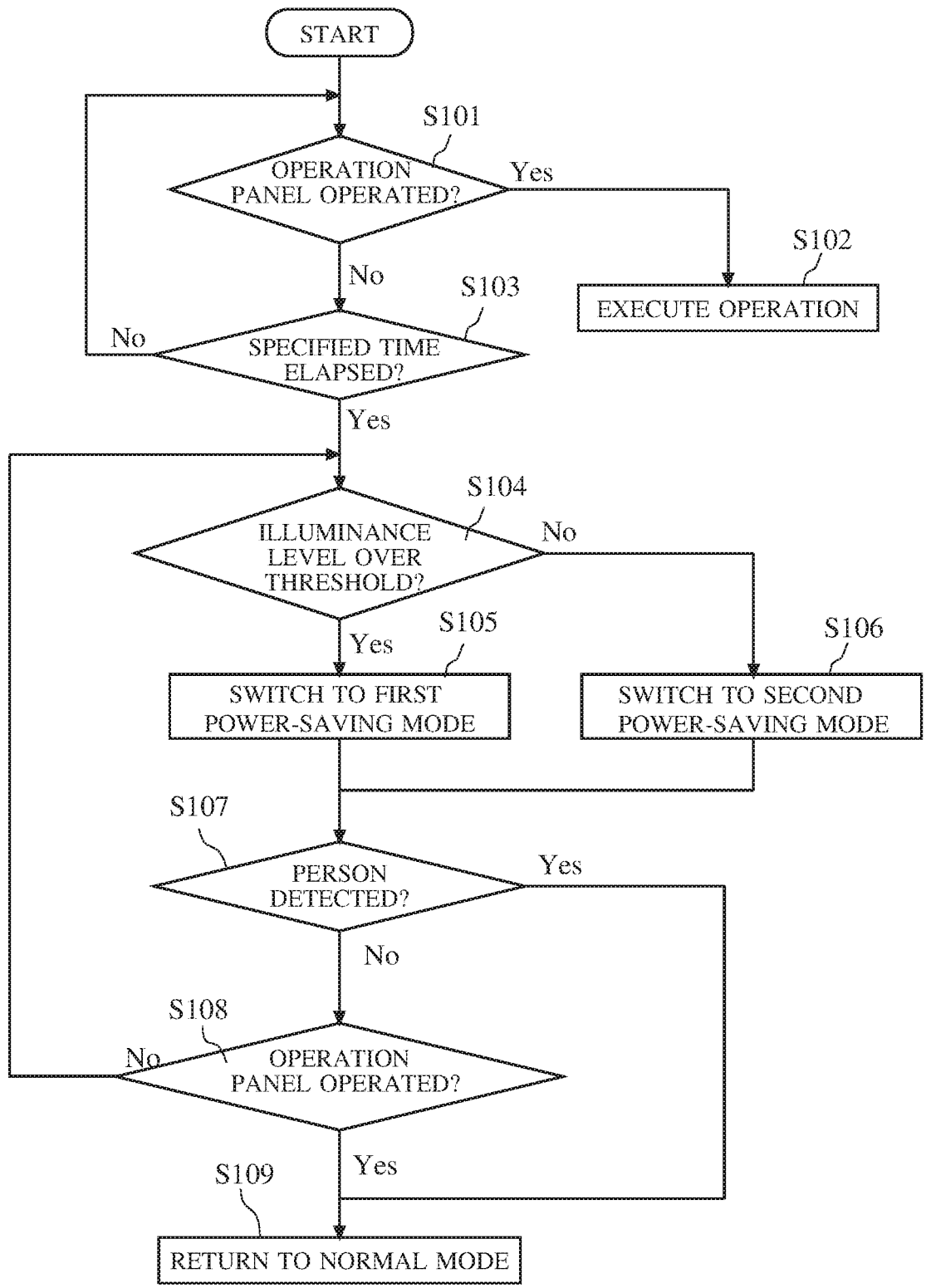
FIG. 3 is a flowchart showing a procedure for transition to the power-saving mode in the multifunction peripheral according to the invention.

Operations of the multifunction peripheral 100 will be described below with reference to the accompanying drawings. FIG. 3 is a flowchart showing a procedure for transition to the power-saving mode in the multifunction peripheral according to the invention. In the multifunction peripheral 100, when a specified time has elapsed under a continued nonoperational state of the operation panel 6, the controller 1 switches over the multifunction peripheral 100 from a normal standby mode (assumed as normal mode) to a power-saving mode of reduced power consumption.

For example, in the normal mode of the multifunction peripheral 100, the fixing part 2d is supplied with electric power so as to be maintained in temperature at a certain temperature level or higher. Also in the normal mode, a home screen is displayed in the display panel 61. Then, electric power is supplied so that the touch panel 62 is enabled to detect touch operation. Thus, even in cases where printing is not executed, a certain level of electric power is consumed in the normal mode.

In the power-saving mode, the controller 1 halts power supply to specified power-interrupted parts. For example, the controller 1 halts current passage to the fixing part 2d, screen display in the display panel 61, and current passage to the touch panel 62. Also, the controller 1 halts power supply, for example, to the document conveyance unit 5, the image reading unit 4, and the printing unit 2. Meanwhile, in the power-saving mode, the controller 1 keeps driving the human detection sensor 81 and the brightness sensor 82. However, the human detection sensor 81 and the brightness sensor 82 require less power consumption as compared with the fixing part 2d and the display panel 61. Therefore, the gross power consumption can be reduced in the power-saving mode, as compared with that in the normal mode. Based on presence or absence of any operation input on the operation panel 6, the controller 1 decides whether to make a switchover to the power saving mode or not.

That is, in the multifunction peripheral 100, the controller 1, based on information from the operation panel 6, checks whether or not the operation panel 6 has accepted any operation (step S101), When the operation panel 6 has accepted an operation (Yes at step S101), the controller 1 executes an operation corresponding to the operation accepted by the operation panel 6 (step S102). Although this flowchart is ended at this point, yet it is also allowable, actually, to return to step S101 subsequent to completion of the operation execution.

When the operation panel 6 has accepted no operation (No at step S101), the controller 1 checks whether or not a specified time has elapsed since the last acceptance of an operation by the operation panel 6 (step S103). In this case, the specified time may be a predetermined one or a time duration determined by the user. Also, based on accumulation of timings for printing operation by the user, the controller 1 may determine a proper specified time. When the specified time has not elapsed (No at step S103), the controller 1 returns to the checking as to whether or not the operation panel 6 has accepted an operation (return to step S101). By repeating step S101 and step S103, the controller 1 can check whether or not the specified time has elapsed under an operation-unaccepted state of the operation panel 6.

When the specified time has elapsed under an operation-unaccepted state of the operation panel 6 (Yes at step S103), the controller 1 switches over from the normal mode to the power-saving mode. In the multifunction peripheral 100, when no operation has been accepted during the specified time, the controller 1 switches over from the normal mode to the power-saving mode. Then, a person coming nearer to a vicinity of the multifunction peripheral 100, i.e. a person present near the multifunction peripheral 100, may operate the multifunction peripheral 100. For this reason, as detailed later, the controller 1 switches over from the power-saving mode to the normal mode.

In a room (e.g., office) where the multifunction peripheral 100 is installed, it is often the case that illumination is left extinguished, or illuminance level of the illumination is lowered, after related persons (users) have gone home. Therefore, while no user is present nearby, the ambient brightness (illuminance level) is low in many cases. Meanwhile, while a user is present in the room, the ambient brightness (illuminance level) is high in many cases.

In the multifunction peripheral 100, the controller 1 switches over between a first power-saving mode and a second power-saving mode, which differ from each other in detection range of the human detection sensor 81 depending on illuminance level. When the illuminance level is high, the controller 1 switches over to the first power-saving mode. When the illuminance level is low, the controller 1 switches over to the second power-saving mode. The first power-saving mode and the second power-saving mode are explained below with reference to the accompanying drawings.

Figure 4:
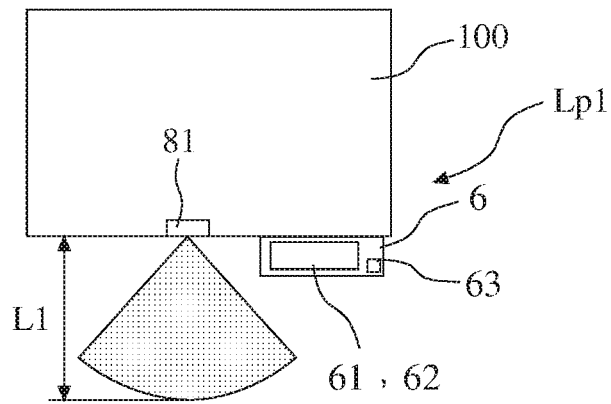
FIG. 4 is a view showing an aspect of the multifunction peripheral as it is switched over to a first power-saving mode.
Figure 5:
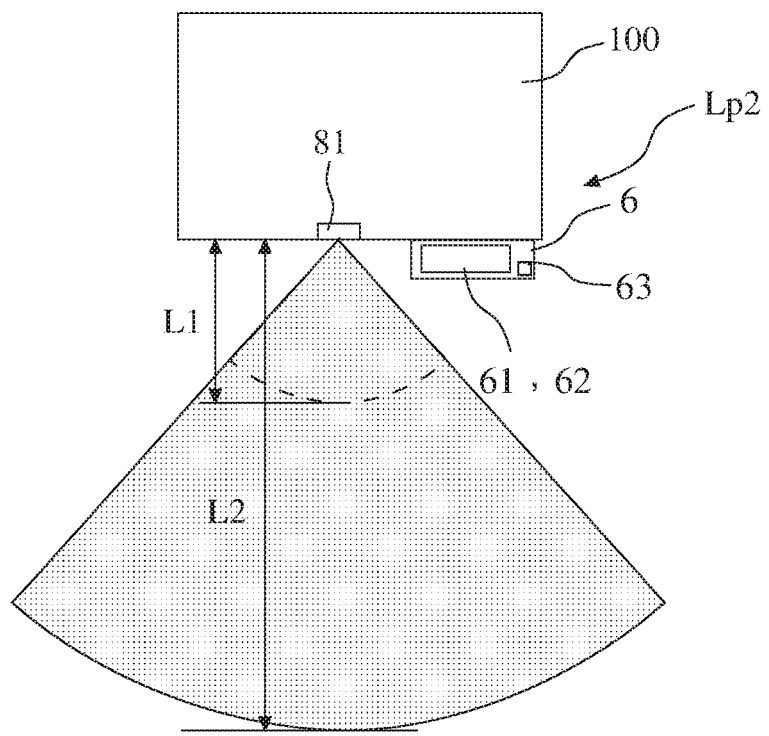
FIG. 5 is a view showing an aspect of the multifunction peripheral as it is switched over to a second power-saving mode.

FIG. 4 is a view showing an aspect of the multifunction peripheral as it is switched over to the first power-saving mode. FIG. 5 is a view showing an aspect of the multifunction peripheral as it is switched over to the second power-saving mode. The controller 1 switches over to the first power-saving mode when the ambient brightness is bright, and switches over to the second power-saving mode when the ambient brightness is dark. In addition, in the first power-saving mode and the second power-saving mode, electric power supply for the fixing part 2d, the display panel 61, and the touch panel 62 is halted individually and similarly.

With a bright condition, i.e. a high level of illuminance, in vicinity of the multifunction peripheral 100, it is decided that one or more persons are present in the room. In this case, returning to the normal mode under the condition that those persons do not use the multifunction peripheral 100 would result in a worse drive efficiency of the power-saving mode. For this reason, the controller 1 returns from the first power-saving mode to the normal mode when presence of any person near the multifunction peripheral 100 is detected. That is, in the first power-saving mode Lp1, as shown in FIG. 4, the detection range of the human detection sensor 81 is set to about a short distance L1 (e.g., several tens of centimeters). As a result of this, in the first power-saving mode Lp1, the mode is switched over to the normal mode when a person has come to a nearness of the distance L1 (short distance) or less to the multifunction peripheral 100. Thus, it is prevented that a person who does not use the multifunction peripheral 100 but has come nearby may be misrecognized as a person who uses the multifunction peripheral 100, so that the return to the normal mode at unnecessary timings is prevented.

With a dark condition, i.e. a low level of illuminance, in vicinity of the multifunction peripheral 100, it is decided that no person is present in the room where the multifunction peripheral 100 is installed. Then, a first person (e.g., worker) that has entered the room often operates the multifunction peripheral 100 in order to check whether or not a facsimile, e-mail or the like has been received during absence of persons. Therefore, in the second power-saving mode, a person is detected over a range wider than in the first power-saving mode. Then, when a person is detected, the second power-saving mode may be switched over to the normal mode.

Accordingly, in the second power-saving mode Lp2, as shown in FIG. 5, the detection range of the human detection sensor 81 is set to a distance L2 (e.g., several meters) longer than the distance L1 of the detection range of the first power-saving mode. That is, the mode is returned from the second power-saving mode to the normal mode when it is detected that a person is present within a range of the distance L2 from the multifunction peripheral 100, which is longer than the distance L1 of the first power-saving mode.

Also in the second power-saving mode, there are no persons, or a few persons, in the vicinity. Therefore, even with a more or less widened human detection range, the mode is less frequently returned to the normal mode. In this case, the power-saving mode efficiency does not lower to a significant extent. In addition, in many cases under the second power-saving mode, there are no persons in the vicinity. Therefore, the human detection sensor 81 may be switched into intermittent operation.

Reverting to FIG. 3, the description on the transition to the power-saving mode is continued. As shown in FIG. 3, for a switchover of the operational mode from the normal mode to the power-saving mode (Yes at step S103), the controller 1, based on information derived from the brightness sensor 82, checks whether or not the illuminance level is equal to or higher than a threshold (step S104). In addition, information to be transmitted from the brightness sensor 82 to the controller 1 may be information about a detected illuminance level or a result of comparison between a detected illuminance level and a threshold.

Then, when the illuminance level is equal to or higher than the threshold (Yes at step S104), the controller 1 switches over the operational mode of the multifunction peripheral 100 from the normal mode to the first power-saving mode (step S105). When the illuminance level is lower than the threshold (No at step S104), the controller 1 switches over the multifunction peripheral 100 from the normal mode to the second power-saving mode (step S106).

Whichever the case is a switchover to the first power-saving mode or a changeover to the second power-saving mode, the controller 1 checks whether or not the human detection sensor 81 has detected a person (step 3107). When the human detection sensor 81 has detected no person (No at step 3107), the controller 1 checks whether or not the operation panel 6 has accepted any operation (step S108).

In an ordinary-use state, the operation panel 6 is operated after detection of a person's nearness. However, depending on a person's position or the like, the operation panel 6 may be operated without detection of a person by the human detection sensor 81. Even in such cases, the provision of step S108 allows return from the power-saving mode to be securely fulfilled.

When the operation panel 6 has accepted no operation (No at step S108), the controller 1 returns to step S104, checking whether or not the illuminance level is equal to or higher than the threshold. With No at step S108, the controller 1 makes a comparison with the threshold of illuminance level, i.e. checking of the ambient brightness, under a state in which the mode has been switched over to the first power-saving mode or the second power-saving mode. Therefore, for example, when the illuminance level has become lower than the threshold in the first power-saving mode, the controller 1 switches over the operational mode to the second power-saving mode, and vice versa. That is, the detection range of the human detection sensor 81 may be changed over while the fixing part 2d, the display panel 61 and the touch panel 62 are maintained in the power-saving mode.

When the human detection sensor 81 has detected a person (Yes at step S107) or the operation panel 6 has accepted an operation (Yes at step S108), the controller 1 returns the operational mode to the normal mode (step S109).

As described above, in the power-saving mode of the multifunction peripheral 100, the controller 1 returns to the normal mode upon detection of a person. In this case, an ambient brightness in vicinity of the multifunction peripheral 100 is detected, and it is decided, depending on the brightness, whether or not there is a person in the vicinity. Then, depending on the presence or absence of a person, the distance of a person approaching the multifunction peripheral 100 relative to the multifunction peripheral 100 is switched over. As a result, the possibility that the power-saving mode may be switched over to the normal mode at a wrong timing can be suppressed.

Second Embodiment

In the multifunction peripheral 100, by the human detection sensor 81 having detected a person under an ambient dark condition, i.e., in the second power-saving mode, the controller 1 switches over the operational mode from the second power-saving mode to the normal mode. In this case, the controller 1 may operate, via the communication unit 7, to turn on at least part of illumination in the room, for example, illumination around the multifunction peripheral 100. Turning on the illumination of the room like this makes it possible to enhance user's convenience. In this case, the controller 1 may suppress return from the power-saving mode to the normal mode. Then, as the vicinity has become bright, the operational mode is switched over from the second power-saving mode to the first power-saving mode. As a result of this, it can be suppressed that the mode is changed over to the normal mode when a person detected in the second power-saving mode does not operate the multifunction peripheral 100.

Third Embodiment

When a person is detected by the human detection sensor 81 in the second power-saving mode, the controller 1 may control the human detection sensor 81 so as to narrow the human detection range. Then, upon detection of a person within a certain range (e.g., a range between one range allowing a person to be detected in the first power-saving mode and another range allowing a person to be detected in the second power-saving mode), the controller 1 returns the operational mode to the normal mode. Switching over the detection range of the human detection sensor 81 stepwise like this makes it possible to decide that a person is approaching the multifunction peripheral 100. Therefore, the controller 1 is enabled to effectively switch over the operational mode from the second power-saving mode to the normal mode. In addition, the controller 1 may restore the human detection range of the human detection sensor 81 to the original range after a certain time has elapsed since the last transition to non-detection of any person by the human detection sensor 81.

Fourth Embodiment

Figure 6:
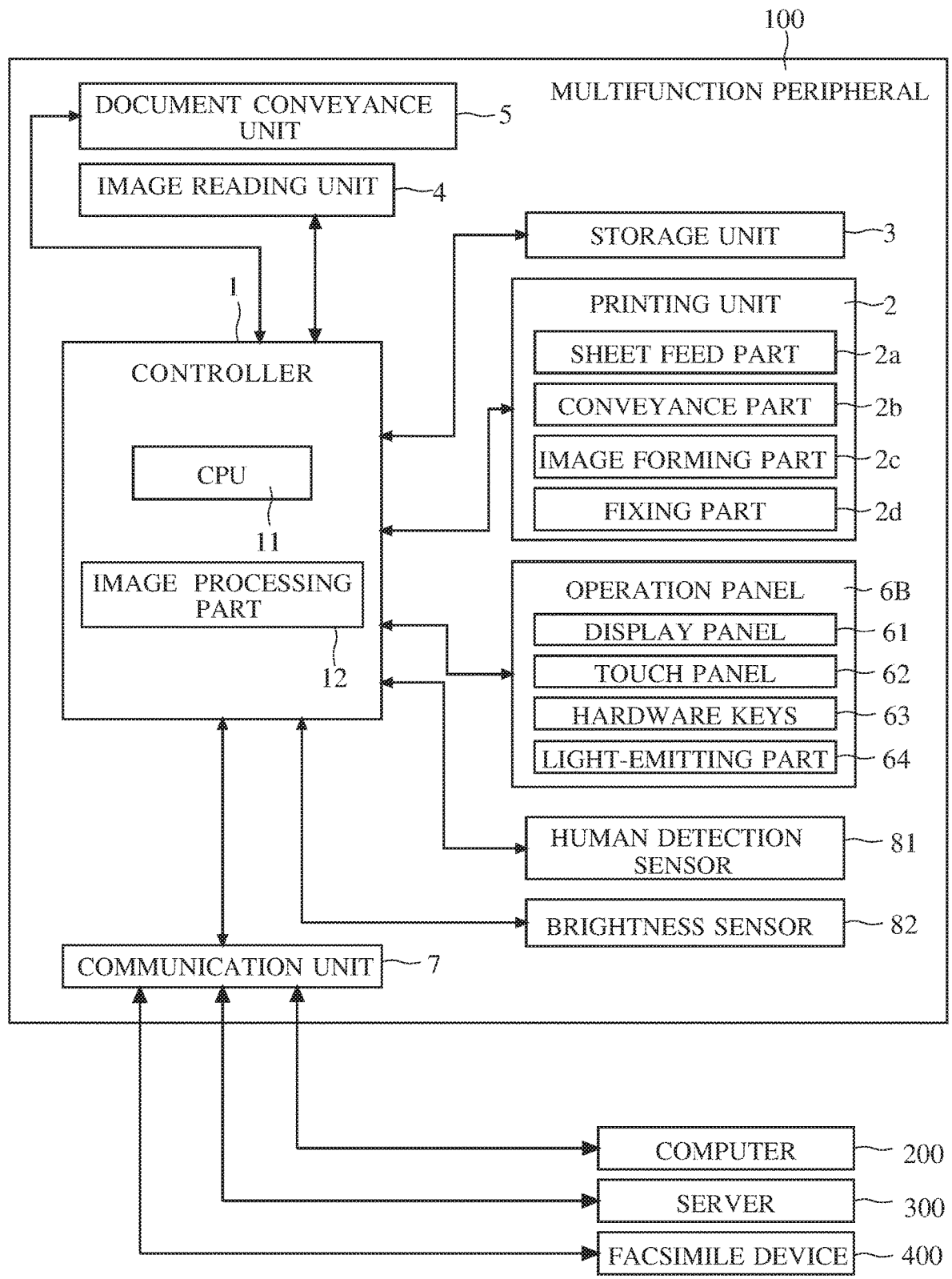
FIG. 6 is a functional block diagram showing a main configuration of another example of the multifunction peripheral according to the invention.
Figure 7:
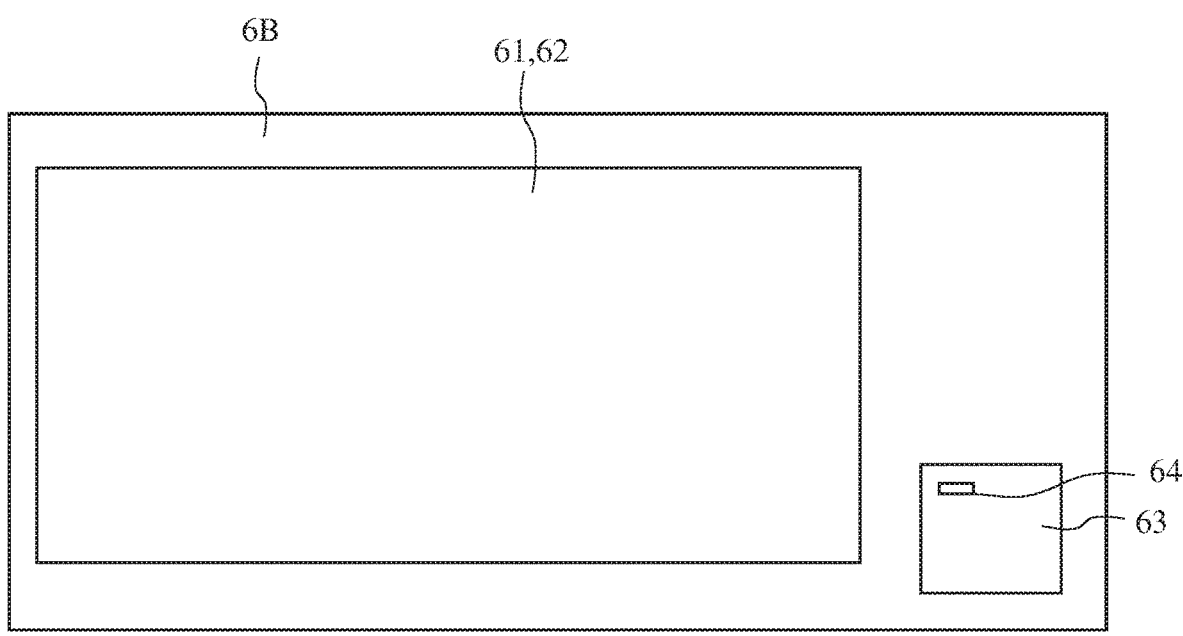
FIG. 7 is a view showing an operation panel of another example of the multifunction peripheral according to the invention.

Another example of the multifunction peripheral according to the present invention will be described with reference to the accompanying drawings. FIG. 6 is a functional block diagram showing a main configuration of another example of the multifunction peripheral. FIG. 7 is a view showing an operation panel of the another example of the multifunction peripheral according to the invention. The multifunction peripheral 100 of this embodiment differs from the multifunction peripheral 100 of the first embodiment in that the multifunction peripheral 100 of this embodiment includes a light-emitting part 64 in an operation panel 6B. Otherwise, the multifunction peripheral 100 of the second embodiment is the same as the multifunction peripheral 100 of the first embodiment, Therefore, substantially like component members in both multifunction peripherals are designated by like reference signs and their detailed description is omitted.

As shown in FIGS. 6 and 7, the operation panel 6B includes a light-emitting part 64 for informing a person of an operational state of the multifunction peripheral 100 as well as a position of the multifunction peripheral 100. The light-emitting part 64 is, for example, an LED or the like. The light-emitting part 64 is connected to the controller 1 and controlled for light emission by the controller 1.

As described above, when the controller 1 switches over the operational mode to the first power-saving mode, the ambient condition is bright. Conversely, when the controller 1 switches over the operational mode to the second power-saving mode, the ambient condition is dark. Therefore, with the operational mode switched over to the first power-saving mode, it is easily possible for a person in the room to discern the operation panel 6B of the multifunction peripheral 100. Meanwhile, with the operational mode switched over to the second power-saving mode, because of the dark ambient condition, it may be difficult for a person in the room to discern the operation panel 6B of the multifunction peripheral 100. Accordingly, in the first power-saving mode, the controller 1 sets the light-emitting part 64 turned off. In the second power-saving mode, the controller 1 sets the light-emitting part turned on. By doing so, it becomes easily possible to discern the operation panel 6B of the multifunction peripheral 100 in the second power-saving mode. Thus, any person is allowed to operate the operation panel 6B of the multifunction peripheral 100 in the second power-saving mode with simplicity.

In addition, the light-emitting part 64 is embedded in one of the hardware keys 63, e.g., a power key. As a result, even under a darkness that makes difficulty in discerning the surroundings, a person can be guided to the power key. In addition, the light-emitting part 64 may be not only embedded in the hardware keys 63 but also provided near the display panel 61 of the operation panel 6B.

Also in this embodiment, the light-emitting part 64 is so designed as to be lit in the second power-saving mode. However, this is not limitative. For example, the light-emitting part 64 is kept turned off in the second power-saving mode. Then, when a person is detected in the second power-saving mode, the controller 1 exerts control to turn on the light-emitting part 64. Furthermore, the controller 1 may return the operational mode to the normal mode when the operation panel 6 has accepted an operation.

(Modification)

In this embodiment, the light-emitting part 64 is turned off in the first power-saving mode, and turned on in the second power-saving mode. However, this is not limitative. For example, the light-emitting part 64 may be designed to emit light in such different ways that the light-emitting part 64 changes over the way of light emission between the first power-saving mode and the second power-saving mode. The ways of light emission may concern color of emitted light, blinks, and the like. Further, the brightness in light emission may be set variable. The ambient brightness is darker in the second power-saving mode than in the first power-saving mode. Therefore, the light emission may be made darker in the second power-saving mode than in the first power-saving mode.

In the individual embodiments described above, two kinds of power-saving modes (first power-saving mode and second power-saving mode) are available depending on ambient brightness. However, without being limited to this, the power-saving mode may be classified into more kinds.

Further, generally in offices or the like, there are many cases where a human motion sensor for detecting a person in a room is installed with an aim of crime prevention. This human motion sensor is enabled to detect presence of a person in a room. The human motion sensor, in many cases, is so designed as to transmit information to a predetermined device upon detection of a person. The multifunction peripheral 100 may be so designed that upon receiving information from the human motion sensor via the communication unit 7 with the operational mode set to the second power-saving mode, the controller 1 returns the operational mode to the normal mode based on the information from the human motion sensor.

Although the embodiments of the present invention have been fully described hereinabove, yet the invention, whose scope is not limited to those embodiments, may be carried out with various changes and modifications unless those changes and modifications depart from the gist of the invention.

An example of the image forming apparatus according to the present invention is capable of switching over between a first power-saving mode Lp1 and a second power-saving mode Lp2, whichever involves less power consumption relative to a normal operational state. The image forming apparatus includes: a human detection unit (human detection sensor 81) for detecting a person present in vicinity: a brightness detection unit (brightness sensor 82) for detecting a brightness in vicinity: an operation unit 6 for accepting an operation made by a user: and a controller 1 connected to the human detection unit (human detection sensor 81), the brightness detection unit (brightness sensor 82), and the operation unit 6. The human detection unit (human detection sensor 81) is variable in human detection range. When a brightness detected by the brightness detection unit (brightness sensor 82) after a certain period has elapsed under an operation-unaccepted state of the operation unit 6 is equal to or higher than a certain brightness, the controller 1 makes a switchover to the first power-saving mode Lp1. When the detected brightness is lower than the certain brightness, the controller 1 makes a switchover to the second power-saving mode Lp2. In the second power-saving mode Lp2, the controller 1 sets the detection range of the human detection unit (human detection sensor 81) wider than in the first power-saving mode Lp1.

With this arrangement, the control section 1, based on a brightness in vicinity, decides whether or not any person is present in the vicinity. Then, when the vicinity is bright, i.e., when a person is present in the vicinity, the controller makes a switchover to the first power-saving mode whose human detection range is narrowed. Thus, the number of times of return to the normal mode due to misdetection is reduced. Also, when the vicinity is dark, i.e., when no person is present in the vicinity, the controller makes a switchover to the second power-saving mode, whose human detection range is wider than in the first power-saving mode, because of less likelihood of misdetection in this case. Thus, when no persons are present in the vicinity, the human detection range is widened. Because no persons are present, there arises less misdetection. Also, since the multifunction peripheral 100 is switched over to the normal mode when a person is detected in the absence of any person, convenience for persons is enhanced.

With the above-described configuration, when a brightness detected by the brightness detection unit (brightness sensor 82) during operation in the first power-saving mode Lp1 has become lower than the certain brightness, the controller 1 makes a switchover to the second power-saving mode Lp2. When a brightness detected by the brightness detection unit (brightness sensor 82) during operation in the second power-saving mode has become equal to or higher than the certain brightness, the controller 1 makes a switchover to the first power-saving mode Lp1. Thus, it becomes possible to switch over the operational mode while a power-saved state is maintained.

With the above-described configuration, when the human detection unit (human detection sensor 81) has detected a person, the controller 1 makes a switchover from the first power-saving mode Lp1 or the second power-saving mode Lp2 to a normal operational state. Thus, when a person has come to nearby the multifunction peripheral 100, the multifunction peripheral 100 is switched over to the normal mode in advance. Therefore, a standby time for the person from arrival at the front of the multifunction peripheral 100 to a usable state of the multifunction peripheral 100 can be reduced or eliminated. As a result, an enhancement of the convenience becomes practicable.

With the above-described configuration, when the operation unit 6 has accepted an operation, the controller 1 makes a switchover from the first power-saving mode Lp1 or the second power-saving mode Lp2 to a normal operational state. With this arrangement, even when a person has approached the multifunction peripheral 100 from a blind spot of the human detection unit (human detection sensor 81) and operated the operation panel 6, the operational mode can be returned to the normal mode.

With the above-described configuration, the operation unit 6B includes a light-emitting part 64, and in the second power-saving mode Lp2, the controller 1 makes the light-emitting part emit light in a way of light emission different from that of the first power-saving mode Lp1. The different ways of light emission may be exemplified by different colors, different brightnesses, lighting or extinguishing, and the like.

With the above-described configuration, during operation in the second power-saving mode Lp2, the human detection unit (human detection sensor 81) intermittently performs detection of a person. In this case, power consumption to be consumed by the human detection unit (human detection sensor 81) in the second power-saving mode (Lp2) can be reduced.

INDUSTRIAL APPLICABILITY

The present invention is applicable to image forming apparatuses capable of shifting to a power-saving mode.

The invention claimed is:

1. An image forming apparatus capable of switching over between a first power-saving mode and a second power-saving mode, whichever involves less power consumption relative to a normal operational state, the apparatus comprising:
    a human detection unit for detecting a person present in vicinity;
    a brightness detection unit for detecting a brightness in vicinity;
    an operation unit for accepting an operation made by a user; and
    a controller connected to the human detection unit, the brightness detection unit, and the operation unit, wherein
    the human detection unit is variable in human detection range,
    when a brightness detected by the brightness detection unit after a certain period has elapsed under an operation-unaccepted state of the operation unit is equal to or higher than a certain brightness, the controller makes a switchover to the first power-saving mode, and when the detected brightness is lower than the certain brightness, the controller makes a switchover to the second power-saving mode, and
    in the second power-saving mode, the controller sets the detection range of the human detection unit wider than in the first power-saving mode.

2. The image forming apparatus according to claim 1, wherein
    when a brightness detected by the brightness detection unit during operation in the first power-saving mode has become lower than the certain brightness, the controller makes a switchover to the second power-saving mode, and
    when a brightness detected by the brightness detection unit during operation in the second power-saving mode has become equal to or higher than the certain brightness, the controller makes a switchover to the first power-saving mode.

3. The image forming apparatus according to claim 1, wherein when the human detection unit has detected a person, the controller makes a switchover from the first power-saving mode or the second power-saving mode to a normal operational state.

4. The image forming apparatus according to claim 1, wherein when the operation unit has accepted an operation, the controller makes a switchover from the first power-saving mode or the second power-saving mode to a normal operational state.

5. The image forming apparatus according to claim 1, wherein
    the operation unit includes a light-emitting part, and
    in the second power-saving mode, the controller makes the light-emitting part emit light in a way of light emission different from that of the first power-saving mode.

6. The image forming apparatus according to claim 5, wherein
    the controller
    in the first power-saving mode, makes the light-emitting part emit light more brightly than in the second power-saving mode.

7. The image forming apparatus according to claim 5, wherein
    the controller
    keeps the light-emitting part lit in the second power-saving mode, and keeps the light-emitting part unlit in the first power-saving mode.

8. The image forming apparatus according to claim 1, wherein
    during operation in the second power-saving mode,
    the human detection unit intermittently performs detection of a person.

* * * * *